US008659894B2

(12) United States Patent
Chao et al.

(10) Patent No.: US 8,659,894 B2
(45) Date of Patent: Feb. 25, 2014

(54) COMPUTER SYSTEM WITH HEAT DISSIPATION APPARATUS

(75) Inventors: Chih-Hang Chao, New Taipei (TW); Wei-Cheng Cheng, New Taipei (TW); Chih-Hsiang Chiang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 150 days.

(21) Appl. No.: 13/445,852

(22) Filed: Apr. 12, 2012

(65) Prior Publication Data
US 2013/0027876 A1 Jan. 31, 2013

(30) Foreign Application Priority Data

Jul. 27, 2011 (TW) .............................. 100126688 A

(51) Int. Cl.
*H05K 7/20* (2006.01)
(52) U.S. Cl.
USPC ................. 361/690; 361/679.47; 361/679.49; 361/679.51; 361/695; 361/697; 165/80.3; 165/104.33; 165/121; 165/122; 454/184
(58) Field of Classification Search
USPC .................. 361/679.46–679.55, 679.33, 688, 361/689–697, 715–724; 165/80.3, 165/121–126, 104.33, 185; 454/184; 174/15.1, 16.3, 252; 313/11, 13, 17, 313/22–25, 35, 36, 44, 46, 582; 349/161, 349/58, 60–65; 312/223.1, 223.2, 236, 312/332.1; 345/60, 905
See application file for complete search history.

(56) References Cited

U.S. PATENT DOCUMENTS

| | | | | |
|---|---|---|---|---|
| 6,680,843 B2 * | 1/2004 | Farrow et al. | ............ | 361/679.02 |
| 7,064,954 B1 * | 6/2006 | Wu et al. | ........................ | 361/695 |
| 7,447,018 B2 * | 11/2008 | Lee et al. | ...................... | 361/695 |
| 7,800,706 B2 * | 9/2010 | Kim et al. | ........................ | 349/58 |
| 8,320,119 B2 * | 11/2012 | Isoshima et al. | ......... | 361/679.47 |
| 8,395,890 B2 * | 3/2013 | Hsieh et al. | .............. | 361/679.47 |
| 8,456,829 B2 * | 6/2013 | Chen et al. | .............. | 361/679.33 |
| 8,564,948 B2 * | 10/2013 | Li | ............................ | 361/679.47 |
| 8,593,806 B2 * | 11/2013 | Huang | .................... | 361/679.49 |
| 2008/0089028 A1 * | 4/2008 | Kim et al. | ...................... | 361/695 |
| 2011/0019358 A1 * | 1/2011 | Liao et al. | .............. | 361/679.46 |
| 2012/0044641 A1 * | 2/2012 | Zhu et al. | ...................... | 361/692 |
| 2012/0057290 A1 * | 3/2012 | Shen et al. | .............. | 361/679.22 |

* cited by examiner

*Primary Examiner* — Michail V Datskovskiy
(74) *Attorney, Agent, or Firm* — Altis Law Group, Inc.

(57) ABSTRACT

A computer system includes a computer case, a cover, and an air duct. The computer case includes a display, a housing connected to the display, a motherboard attached to the housing, and a fan module. The motherboard includes a heat generating component. An input opening and an output opening are defined in the cover. The output opening corresponds to the fan module. The air duct is mounted over the heat generating component. The air duct includes a top plate substantially parallel to the motherboard and a first side plate extending from the top plate. The first side plate is substantially perpendicular to the top plate. The first side plate defines a plurality of first airflow holes corresponding to the input opening. The top plate defines a plurality of through holes corresponding to the heat generating component.

17 Claims, 6 Drawing Sheets

COMPUTER SYSTEM WITH HEAT DISSIPATION APPARATUS

BACKGROUND

1. Technical Field

The present disclosure relates to computer systems, more particularly to a computer system with a heat dissipation apparatus.

2. Description of Related Art

Heat dissipation devices perform the critical function of removing heat from a computer system. For example, a plurality of fans may be provided to efficiently dissipate heat. Air is directed out of the computer system by the fan, for dissipating heat generated in the computer system. However, when the air flows in a disorderly manner in the computer system, the heat dissipation efficiency of the computer system is decreased.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
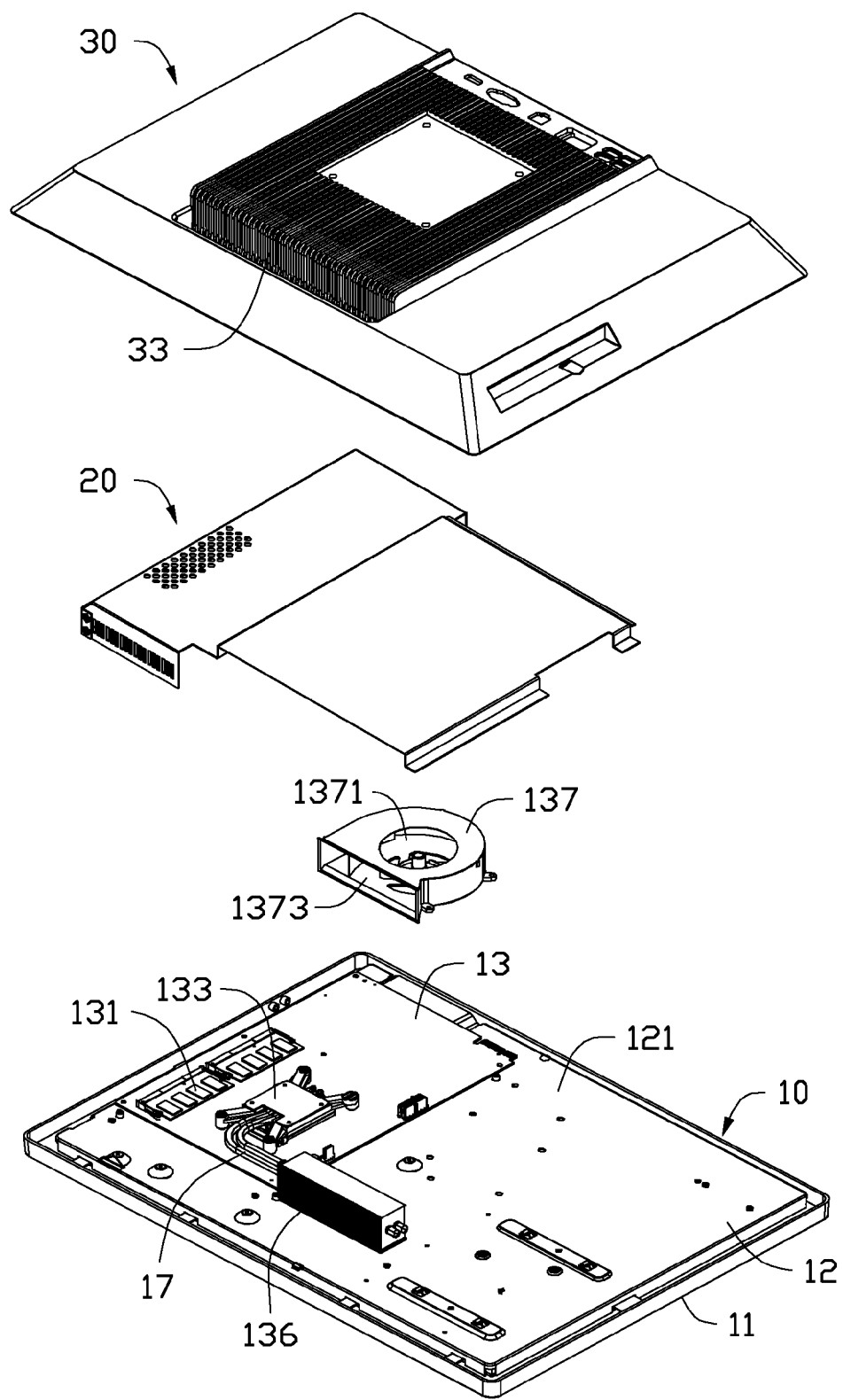
FIG. 1 is an exploded, isometric view of a computer system in accordance with an exemplary embodiment.
Figure 2:
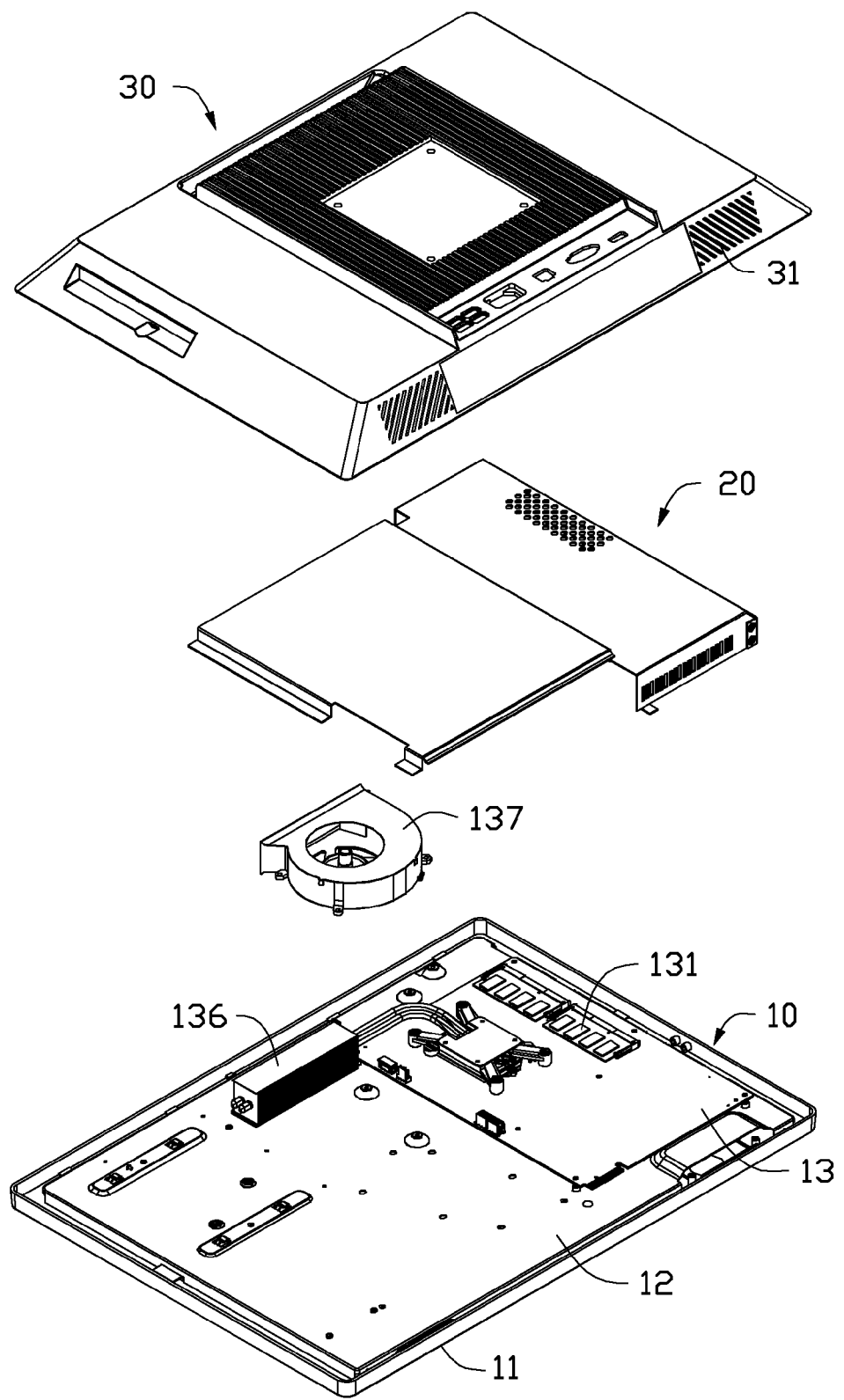
FIG. 2 is similar to FIG. 1, but viewed in another aspect.

Referring to FIG. 1, a computer system in accordance with an exemplary embodiment includes a computer case 10, an air duct 20, and a cover 30 attached to the computer case 10. In one exemplary embodiment, the computer system can be an all-in-one computer.

The computer base includes a display 11, a housing 12 connected to the display 11, and a motherboard 13 mounted on the housing 12. The display 11 is secured to a first side of the housing 12, and the motherboard 13 is attached to a second side of the housing 12 that is opposite to the first side.

The housing 12 includes a bottom panel 121. The motherboard 13 includes various components. The components include a plurality of memory cards 131 parallel to each other. A heat dissipation base 133 is mounted on a central processing unit (not shown). A fin assembly 136 and a fan module 137 corresponding to the fin assembly 136 are mounted in the middle of the housing 12. The fin assembly 136 includes a plurality of fins parallel to each other. A plurality of heat pipes 17 are connected between the heat dissipation base 133 and the fin assembly 136. The fan module 137 defines an input vent 1371 and an output vent 1373. The output vent 1373 corresponds to the fin assembly 136. The input vent 1371 is substantially perpendicular to the output vent 1373. The input vent 1371 is substantially parallel to the motherboard 13.

Figure 3:
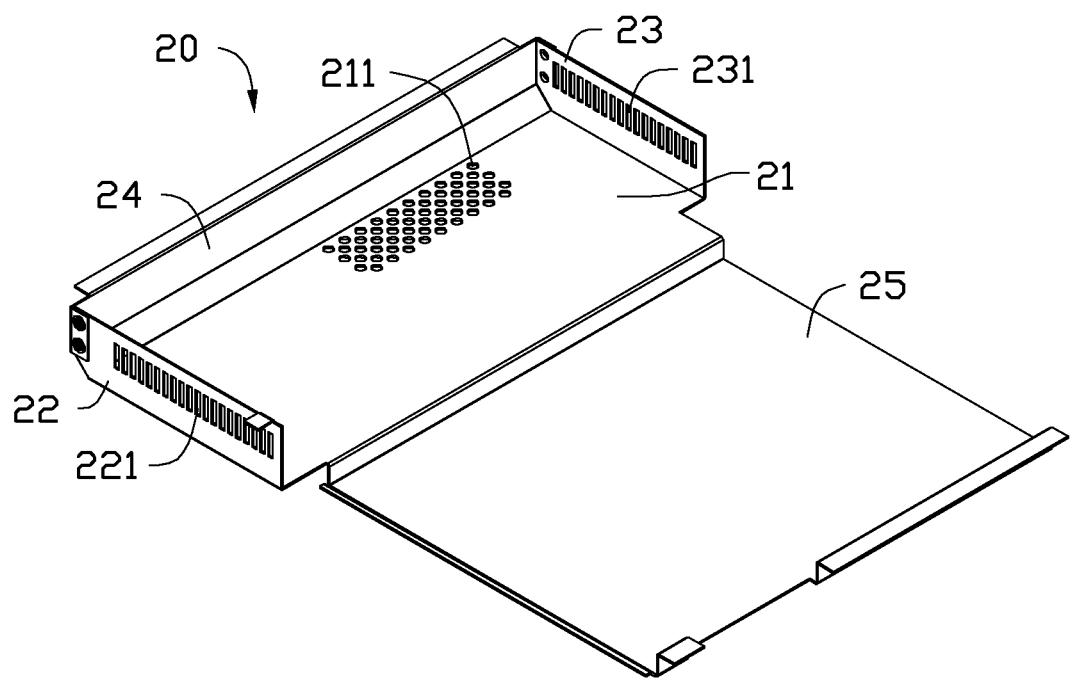
FIG. 3 is an isometric view of an air duct of FIG. 1.
Figure 4:
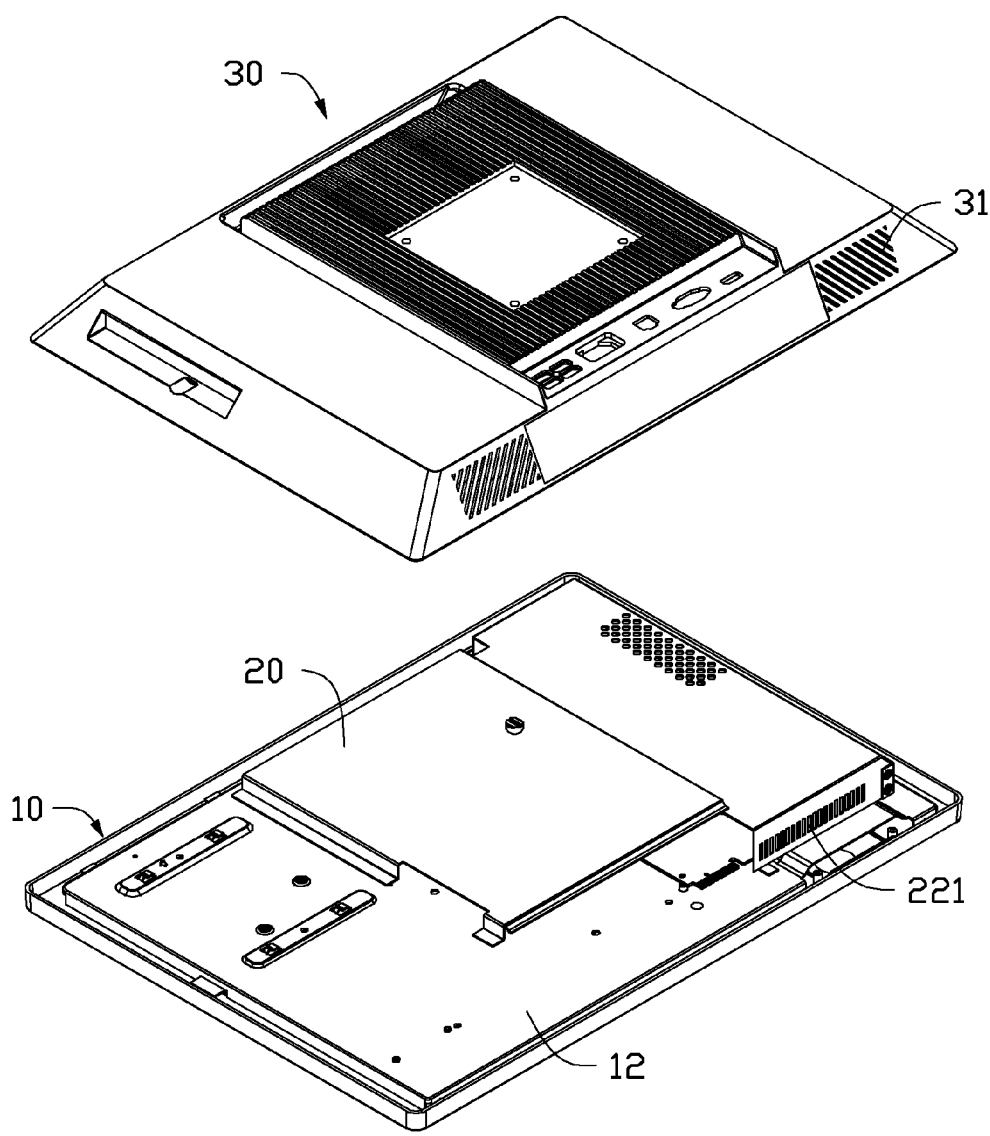
FIG. 4 is exploded, isometric view of FIG. 1 when the air duct assembled to a computer case.
Figure 5:
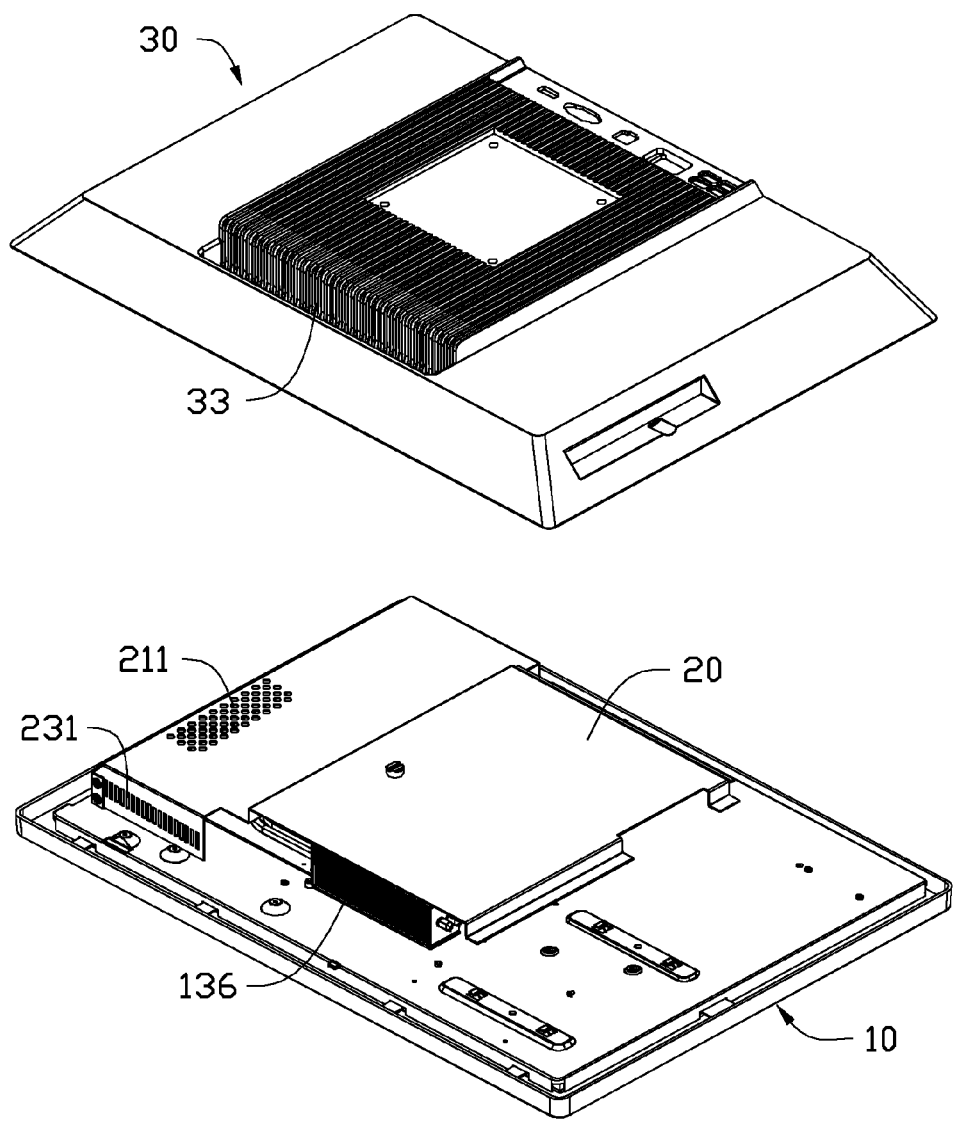
FIG. 5 is similar to FIG. 4, but viewed in another aspect.
Figure 6:
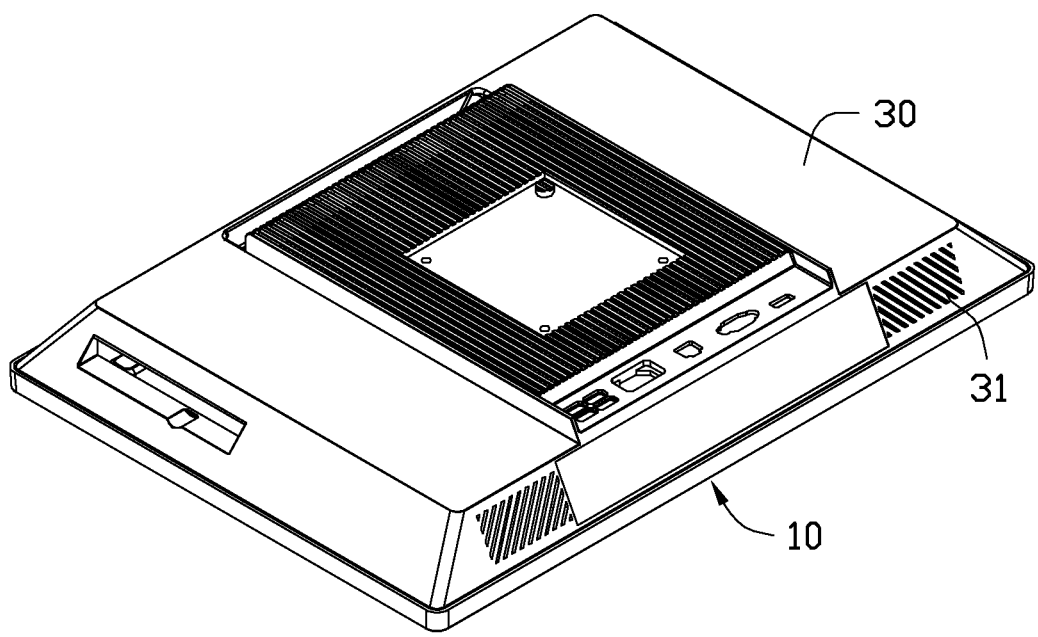
FIG. 6 is an assembled view of FIG. 1.

Referring to FIGS. 1 and 3, the air duct 20 includes a top plate 21 that is substantially parallel to the motherboard 13, a first side plate 22 extending from the top plate 21, a second side plate 23 extending from the top plate 21, and a third side plate 24 extending from the top plate 21. The first side plate 22, the second side plate 23, and the third side plate 24 are substantially perpendicular to the top plate 21. The first side plate 22 and the second side plate 23 are substantially parallel to each other. The third side plate 24 is substantially perpendicular to the first side plate 22. The top plate 21 is substantially parallel to the memory card 131.

The top plate 21 defines a plurality of through holes 211 corresponding to the memory cards 131. The first side plate 22 defines a plurality of first elongated airflow holes 221. The second side plate 23 defines a plurality of second elongated airflow holes 231. The second elongated airflow holes 231 are adjacent to the third side plate 24. The air duct 20 further includes a resisting plate 25 extending from the top plate 21. The resisting plate 25 is used for resisting the cover 30 to keep a distance between the top plate 21 and the cover 30. The second side plate 23 is substantially perpendicular to the memory card 131.

An input opening 31 is defined in the cover 30 corresponding to the first elongated airflow hole 221 of the first side plate 22. An output opening 33 is defined in another side of the cover 30 corresponding to the fin assembly 136.

Referring to FIGS. 1 to 6, in assembly, the air duct 20 is located over the memory cards 131. At this time, the through holes 211 of the top plate 21 and the second elongated airflow holes 231 correspond to the memory cards 131. The cover 30 is mounted on the computer case 10. The cover 30 resists the resisting plate 25 of the air duct 20. The input opening 31 corresponds to the first elongated airflow holes 221 of the first side plate 22. The output opening 33 corresponds to the fin assembly 136.

In use, air flows into the first input opening 31. Air flows into the air duct 20 to dissipate heat generated by the memory cards 131 via the through holes 211, the first elongated airflow holes 221 and the second elongated airflow holes 231. At the same time, air flows to the heat dissipation base 133. Finally, air flows to the fin assembly 136 by the fan module 137 and flows out of the computer system via the output opening 33.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a computer case, the computer case comprising a display, a housing connected to the display, a motherboard located on the housing, and a fan module; the motherboard comprising a heat generating component;
   a cover, an input opening and an output opening defined in the cover, the output opening corresponding to the fan module; and
   an air duct, the air duct mounted over the heat generating component; the air duct comprising a top plate substantially parallel to the motherboard and a first side plate extending from the top plate; the first side plate substantially perpendicular to the top plate; the first side plate defines a plurality of first airflow holes that corresponding to the input opening; and the top plate defining a plurality of through holes that corresponding to the heat generating component.

2. The computer system of claim 1, wherein the air duct further comprises a second side plate extending from the top plate; the second side plate is substantially perpendicular to the top plate and substantially parallel to the first side plate; and the second side plate defines a plurality of second airflow holes.

3. The computer system of claim 2, wherein the air duct further comprises a third side plate connected between the first side plate and the second side plate, and the plurality of second airflow holes is located in the second side plate.

4. The computer system of claim 3, wherein the third side plate is substantially perpendicular to the top plate.

5. The computer system of claim 1, wherein the air duct further comprises a resisting plate extending from the top plate, and the resisting plate abuts the cover to keep a distance between the cover and the top plate.

6. The computer system of claim 1, wherein the heat generating component is a memory card, the memory card is substantially parallel to the motherboard.

7. The computer system of claim 1, further comprising a fin assembly corresponding to the output opening, wherein the fan module defines an output vent corresponding to the fin assembly.

8. The computer system of claim 7, wherein the fan module defines an input vent substantially perpendicular to the output vent.

9. The computer system of claim 1, wherein the plurality of first airflow holes are elongated holes.

10. A computer system comprising:
a computer case, the computer case comprising a display, a housing connected to the display, a motherboard located on the housing, a fan module, a heat dissipation base configured to contact a first heat generating component, a fin assembly, a heat pipe connected between the heat dissipation base and the fin assembly; the motherboard comprising a second heat generating component; the fan module defining an input vent and an output vent; the output vent corresponding to the fin assembly; and the input vent substantially parallel to the motherboard;
a cover, an input opening and an output opening defined in the cover, the output opening corresponding to the fin assembly; and
an air duct, the air duct mounted over the second heat generating component and the heat dissipation base; the air duct comprising a top plate that is substantially parallel to the motherboard and a resisting plate extending from the top plate; the resisting plate abutting the cover to keep a distance between the cover and the top plate; and the top plate defining a plurality of through holes corresponding to the second heat generating component.

11. The computer system of claim 10, wherein the air duct further comprises a first side plate extending from the top plate; the first side plate is substantially perpendicular to the top plate; and the first side plate defines a plurality of first airflow holes corresponding to the input opening.

12. The computer system of claim 11, wherein the air duct further comprises a second side plate extending from the top plate; the second side plate is substantially perpendicular to the top plate and substantially parallel to the first side plate; and the second side plate defines a plurality of second airflow holes.

13. The computer system of claim 12, wherein the air duct further comprises a third side plate connected between the first side plate and the second side plate, and the plurality of second airflow holes is located in the second side plate.

14. The computer system of claim 13, wherein the third side plate is substantially perpendicular to the top plate.

15. The computer system of claim 11, wherein the plurality of first airflow holes are elongated holes.

16. The computer system of claim 10, wherein the second heat generating component is a memory card, the memory card is substantially parallel to the motherboard.

17. The computer system of claim 10, wherein the input vent is substantially perpendicular to the output vent.

\* \* \* \* \*